United States Patent [19]

Bhaga et al.

[11] Patent Number: 5,525,270
[45] Date of Patent: Jun. 11, 1996

[54] TOWER PACKING

[76] Inventors: Dahya Bhaga, 20 Hood Crescent, Scarborough, Ontario, Canada, M1W 3C1; Gordon M. Cameron, 4 Wellesbourne Crescent, Willowdale, Ontario, Canada, M2H 1Y7

[21] Appl. No.: 325,517

[22] Filed: Oct. 19, 1994

[30] Foreign Application Priority Data

Oct. 26, 1993 [CA] Canada ................................ 2109253

[51] Int. Cl.$^6$ ................................................. B01F 3/04
[52] U.S. Cl. ................................. 261/94; 261/DIG. 72
[58] Field of Search .......................... 261/94, DIG. 72

[56] References Cited

U.S. PATENT DOCUMENTS

| | | | |
|---|---|---|---|
| 3,151,187 | 9/1964 | Comte | 261/DIG. 72 |
| 3,266,787 | 8/1966 | Eckert | 261/DIG. 72 |
| 4,086,307 | 4/1978 | Glaspie | 261/DIG. 72 |
| 4,256,673 | 3/1981 | Braun | 261/DIG. 72 |
| 4,316,863 | 2/1982 | Leva | 261/DIG. 72 |
| 4,519,960 | 5/1985 | Kitterman et al. | 261/DIG. 72 |
| 5,200,119 | 4/1993 | Leva | 261/DIG. 72 |

FOREIGN PATENT DOCUMENTS

| | | | |
|---|---|---|---|
| 1769581 | 8/1977 | Germany | 261/DIG. 72 |
| 5-31355 | 2/1993 | Japan | 261/DIG. 72 |

*Primary Examiner*—Tim R. Miles
*Attorney, Agent, or Firm*—Cushman Darby & Cushman

[57] ABSTRACT

An improved tower saddle packing having a general shape that is a segment of a hollow torus. The circumferential outer edges of the saddle define a plurality of radially, outwardly extending convex lobes. The lobes and wing portions preferably have weep holes to effectual wetting of all surfaces of the saddle. The hub of the saddle has in one aspect a plurality of apertures extending substantially across the hub. The saddle provides improved gas-liquid interaction, permits enhanced gas throughput in an absorption tower and allows for reduced tower packing sections.

6 Claims, 3 Drawing Sheets

TOWER PACKING

FIELD OF THE INVENTION

This invention relates to tower packing for use in exposing a liquid to a gas in co-current or countercurrent flow and, particularly, to tower packing of the saddle type of use in the manufacture of sulphuric acid.

BACKGROUND TO THE INVENTION

Toroidal ceramic saddles of the type described in U.S. Pat. No. 2,639,909, issued May 26, 1953 to Leva, have been used extensively as tower packing for decades with little physical shape change. The ceramic saddle described in U.S. Pat. No. 2,639,909 has a general shape that is a segment of an inner-peripheral portion of a hollow torus, with respect to the axis of generation of the torus, the packing having at each of its ends an arcuate end-edge face that lies substantially in a plane that is radial in relation to the axis of the torus, with the axis also lying substantially in the plane of the respective arcuate end-edge face, the margins of the packing that are farthest from the axis being substantially circular arcs with their centres at the axis. This saddle, thus, consists of a half section of the inner half of a toroid having a concave surface to the outside, i.e. to the gas/liquid phase, and has proven to be commercially successful.

With the continuing pressure to reduce cost, saddle sizes have grown as larger saddles have lower flow resistance to gas. Absorption towers containing the packing can be built with smaller diameters with lower cost. On the other hand, large saddle sizes have less interfacial area for mass transfer in a given volume of packing and higher packing depths are needed for the same mass transfer duty. At this time with ceramic saddles, it appears that a 75 mm diameter ceramic saddle is about as large as is practical. A larger size of packing, i.e. 150 mm is available, but at significant extra cost and so far has not been found cost-effective.

One alternative type of packing which has been used to a lesser degree is a ring-type packing in which a cross is inserted to form what is called a "mini-ring". This shape is available in sizes up to 150 mm and have a modestly greater capacity than the standard saddle. The ring is not, however, as good at spreading liquid across the tower cross-section and extra care is thus needed in design.

Although an improved saddle, described in U.S. Pat. No. 3,232,589, issued Feb. 1, 1966 to Eckert J. S. has been available for some time, it has not been widely accepted for industrial use.

Notwithstanding the continued commercial success of the basic toroidal shaped saddle packing element, there remains a demand for more cost-effective packing.

SUMMARY OF THE INVENTION

It is an object of the present invention to provide an improved cost-effective saddle packing.

It is a further object of the invention to provide saddles for tower packing which permit significantly enhanced gas throughput in the tower.

It is a further object of the invention to provide improved saddles which allows use of larger sizes of packing with greater gas handling capacity without requiring the significantly increased height of the packing section of a gas absorption tower.

These and other objects will become apparent from a reading of the disclosure as a whole.

Thus, in one aspect the invention provides an improved tower packing saddle having a general shape that is, essentially, a segment of an inner-peripheral portion of a hollow toms, with respect to the axis of generation of the torus, said saddle having a hub central of the toms defined by a pair of parallel aligned ribs remote one from the other extending the inner circumference of the saddle, said hub formed of a first thickness of material and having hub portion defining a plurality of apertures within said hub, a pair of circumferential outer edges wherein each of said edges and said rib closest to said edge define a wing portion formed of a second thickness of material, the improvement comprising said outer edges defining a plurality of radially outwardly extending convex lobes, wherein each lobe is separated from an adjacent lobe by an interlobal distance and adjacent lobes define therebetween a recess depth.

Preferably, each lobe defines a substantially flat outer edge portion of a length greater than the interlobal distance and greater than the recess depth. More preferably, the flat outer edge portion length is at least two times, and more preferably three times, greater than each of the interlobal distance and recess depth.

In a further aspect the invention provides an improved tower packing saddle having a general shape that is a segment of an inner-peripheral portion of a hollow torus, with respect to the axis of generation of the torus, said saddle having a hub central of the torus defined by a pair of parallel aligned ribs remote one from the other extending the inner-circumference of the saddle, said hub formed of a first thickness of material and having hub portions defining, a plurality of apertures within said hub, a pair of circumferential outer edges wherein each of said edges and said rib closest to said edge define a wing portion formed of a second thickness of material; the improvement comprising wherein said wing portion comprises a plurality of body portions defining apertures of sufficient size and number to effect substantially full wetting of all surfaces of said saddle.

In a yet further aspect the invention provides an improved tower packing saddle having a general shape that is a segment of an inner-peripheral portion of a hollow torus, with respect to the axis of generation of the torus, said saddle having a hub central of the torus defined by a pair of parallel aligned ribs remote one from the other extending the inner-circumference of the saddle, said hub formed of a first thickness of material and having hub portions defining hub apertures within said hub, a pair of circumferential outer edges wherein each of said edges and said rib closest to said edge define a wing portion formed of a second thickness of material; the improvement comprising said hub aperture extending substantially across the distance between said ribs.

The Eckert saddle described in aforesaid U.S. Pat. No. 3,232,589 has scallops cut in its edges to break up the liquid flow by means of portions defining relatively pointed areas where the scalloped sections meet. These edges are thus formed into a series of concave hollows between adjacent scallops having relatively sharp points. The saddles according to one aspect of the present invention, in contrast have significantly large flat lobe edges in which the lobes have clear, sharp interlobal distances. The interlobal distance must be sufficient to ensure that liquid does not easily bridge from one lobe to the next. A gap of about 1 cm is preferred. The slot or separation recess depth between lobes needs to be sufficiently deep to ensure that the edge of the wing represents a number of discrete separate lobes and that the wings retain adequate mechanical strength. The convex shape creates significant drip points as liquid is much less likely to run back to the root than where the concave hollows of Eckert are used.

The saddles as hereinabove defined, thus, preferably comprise outer circumferential edges comprising a plurality of lobes separated one from the other by interlobal distances, each lobe constituted as substantially flattened circular arcs having their centres at the axis of generation of the torus. The surface of each lobe at its portion remote from the body of the wing alternatively may be gently rounded i.e. for example, oval, semi-circular or elliptical; and/or substantial concentric with the inner surface of the toroid.

In a more preferred embodiment, the interlobal separations on the wings are more in the nature of slots, each having a rounded bottom to avoid cracking during manufacture and having essentially parallel radial side walls. A preferred angle between the top of the flattened lobe and a slot side is close to a right angle. This minimises the possibility of liquid running back around the slot. Liquid testing suggests that the slot width should preferably be at least 10 mm to reduce liquid bridging and sealing of the slot.

Saddles of the present invention are of a shape relative to prior art that the countercurrent flow of gas and liquid streams are more dispersed, while the gas flow paths are less tortuous than those found in the prior art saddle packed towers. This provides for enhanced tower gas throughput. The contact areas between the liquid and gas is increased by the additional divisions of the streams as well as providing additional ceramic surfaces exposed to both fluids in the apertures and allows of a relatively large base shape to provide a good mass transfer efficiency presently held only by relatively smaller saddles of the prior art.

The saddles may be formed of any suitable material, such as a suitable metal or thermoplastics material or preferably, a ceramics material.

BRIEF DESCRIPTION OF THE DRAWINGS

In order that the invention may be better understood, a preferred embodiment will now be described by way of example only, with reference to the accompanying drawings wherein.

DETAILED DESCRIPTION OF A PREFERRED EMBODIMENT

Figure 1:
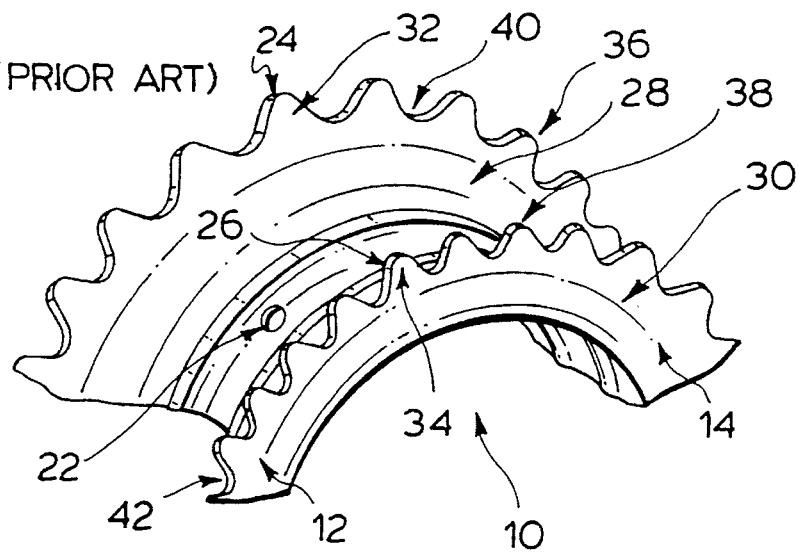
FIG. 1 represents a perspective view of a prior art saddle.

FIG. 1 shows generally as 10 a ceramic saddle having a general shape that is a segment of an inner-peripheral portion of a hollow torus, with respect to the axis of generation of the torus. Saddle 10 has ends 12, 14, each having an arcuate end-edge face that lies substantially in a plane that is radial with relation to the axis of the torus. The axis also lies substantially in the plane of the respective arcuate end-edge face and with the margins of saddle 10 that are farthest from the axis being substantially circular arcs with their centres at the axis.

Saddle 10 has a hub 16 central of the torus bounded by a pair of parallel aligned ribs 18, 20, which extend the circumference of saddle 10 either side of hub 16. Hub 16 is of sufficient thickness to provide reasonable strength to the saddle, and has a plurality of apertures 22 disposed throughout a central portion of hub 10. Saddle 10 has a pair of circumferential outer edges shown generally as 24, 26 which with ribs 18 and 20, respectively, define wing portions 28, 30 respectively. Each edge 24, 26 defines a plurality of scallops 32, 34 respectively, which radially extends from the body of the wings and which are typically, formed as pointed as feasible. The edges of the adjacent indented surfaces which form the scallops meet in substantially line contacts in saddle 10 edges. FIG. 1 shows the surfaces of the scallops to define, preferably pointed extreme portions 36, 38 followed by a concave surface 40, 42 respectively which constitutes the hollow portion essentially between each adjacent pair of scallops.

Figure 2:
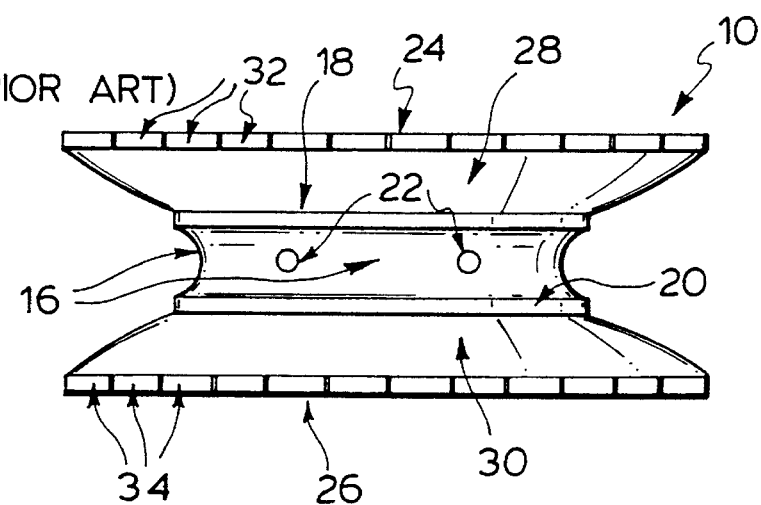
FIG. 2 represents a plan view of a prior art saddle.
Figure 3:
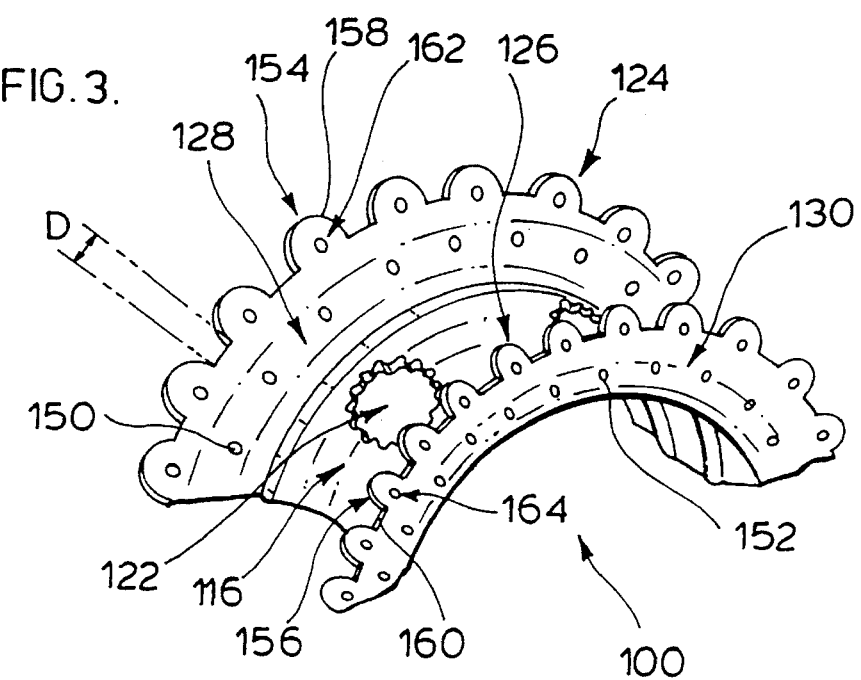
FIG. 3 represents a perspective view of a ceramic saddle according to the invention.
Figure 4:
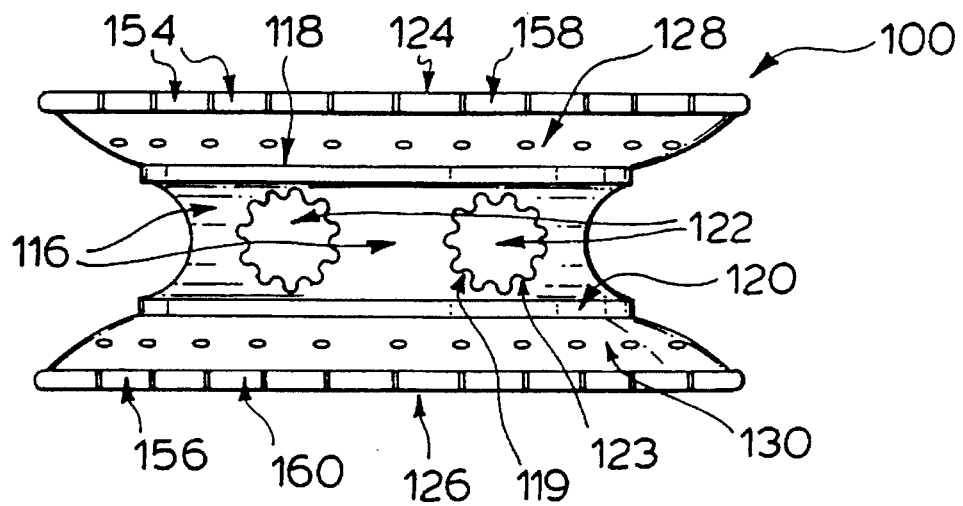
FIG. 4 represents a diagrammatic plan view of a ceramic saddle according to the invention.

With reference now to FIGS. 3 and 4, these show generally as 100, a ceramic saddle of substantially the same general shape as that of FIGS. 1 and 2.

Saddle 100 has a hub 116, central of the torus defined by a pair of parallel ribs 118, 120, which extend the circumference of saddle 100. Hub 116 has a plurality of apertures 122, which apertures extend the full width of hub 116 between ribs 118 and 120. Apertures 122 define a substantially right vertical cylinder through the hub thickness, which cylinder has a continuous serrated surface 119 and has an outer perimeter 123 greater than 4 times the hub thickness. In an alternative aperture 122 has a minimum width, irrespective of the size of the aperture 122, of at least twice the hub thickness.

Circumferential outer edges shown generally as 124, 126 with ribs 118, 120, respectively define wing portions 128, 130, respectively. Each of wing portions 128, 130, has a plurality of weep apertures 150, 152, respectively of sufficient size and number, and so disposed onto another, as to readily effect substantially full wetting of all surfaces of the saddle 100 during operation, without causing non-acceptable structural weakness to wing portions 128, 130. Further, the apertures have a cross-sectional width similar to the wing thickness and are spaced apart a distance sufficient to ensure adequate structural strength in the wing. Weep apertures 150, 152 have a maximum width of less than the wing thickness and are spaced apart at a distance of at least three times the maximum width of aperture 150, 152, which is sufficient to ensure adequate structural strength in the wing.

Edges 124, 126 define a plurality of radially extending convex lobes 154, 156, respectively, each lobe being separated by an inter-lobal distance "D" which defines a substantially circular arc having its centre at the axis of generation of the torus. Each lobe 154, 156 at its surface portions 158, 160, respectively, remote from wings 128, 130, respectively, is gently curved to define an arc of a circle. Alternative lobe embodiments have surface portions defining arcs of an ellipse. Each of lobes 154, 156 has a weep-aperture 162, 164.

Figure 5:
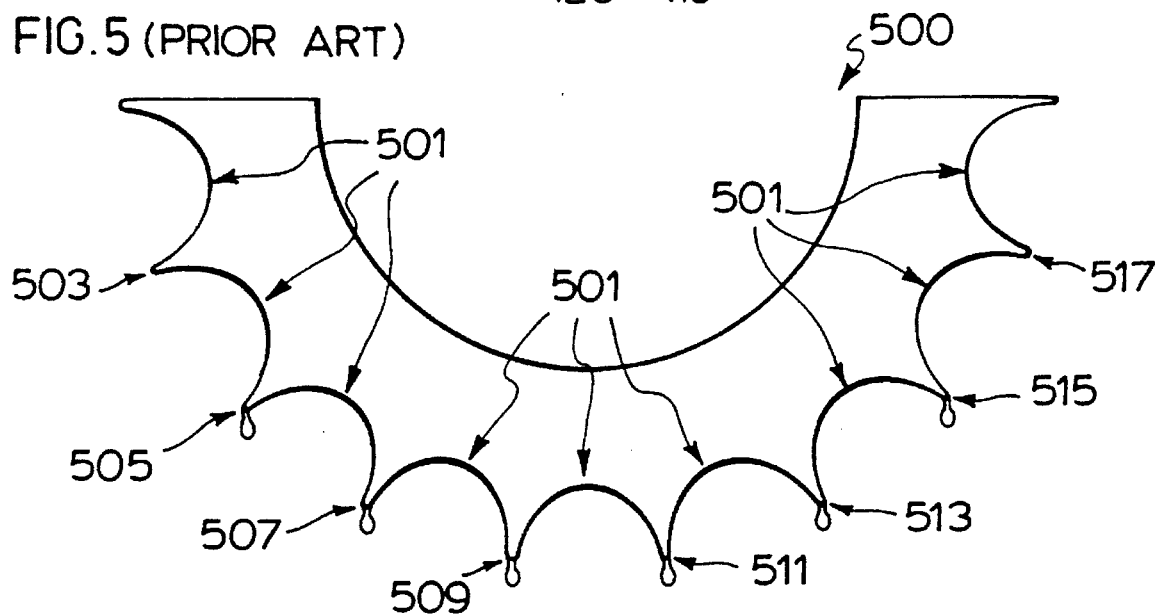
FIG. 5 represents a diagrammatic sectional view of a wing edge of scalloped design of prior art with schematic liquid drops attached thereto.

FIG. 5 shows part of the outer edge of a prior art saddle 500 having scalloped portions 501 and projecting points between scallops, 503–517. Drops of liquid are shown forming on points 505, 507, 509, 511,513, 515 where the angle of the lower edge of the scallop does not allow liquid to run back to the main surface of the saddle as occurs in points 503 and 517.

Figure 6:
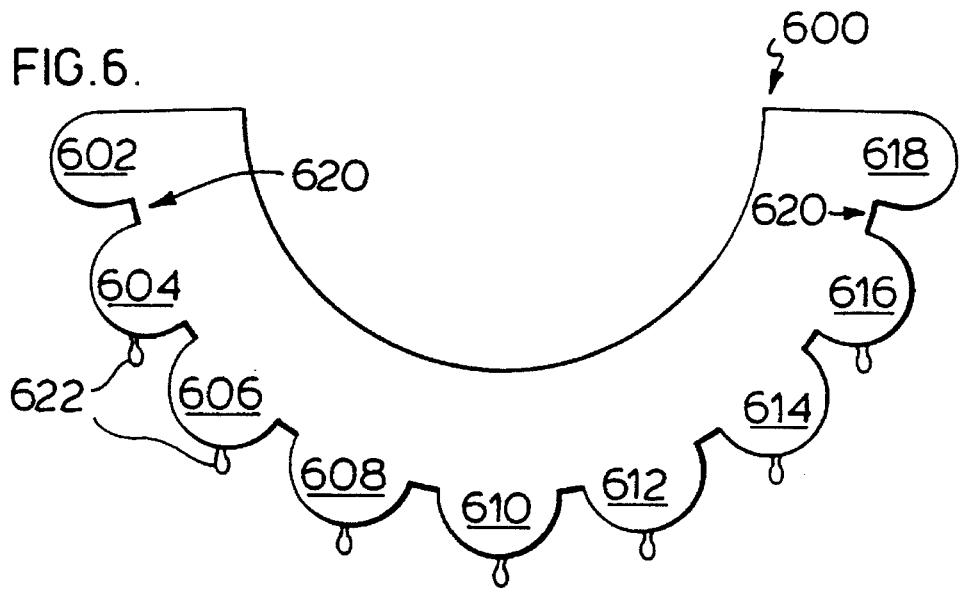
FIG. 6 represents a diagrammatic sectional view of wing edges according to the invention with attendant drops of liquid attached thereto.

FIG. 6, in comparison, shows a number of convex lobes 602, 604, 606, 608,610, 612, 614, 616 and 618 on the edge of the wing of saddle 600 according to the invention. Lobes 602–618 are separated by interlobal distance 620 such that liquid cannot bridge the gap between adjacent lobes. Liquid on the lobes will therefore run off the lowest points on the lobes and droplets, 622 are shown on lobes 604–616.

In hereinbefore mentioned prior art U.S. Pat. No. 3,232, 589-EcKert, it is taught to have relatively sharp points between the scallops. Where liquid flows down the edge as is likely to be the case at points 517 and 519, little new liquid surface is created. By comparison, lobes 602 and 618 in instant application are likely to form droplets which then drip onto the next lower lobes 604–616. This gives significantly greater liquid mixing and surface generation. The size of the gaps between lobes is clearly up to the designer but should be sufficient to minimize the liquid bridging from lobe to lobe.

Figure 7:
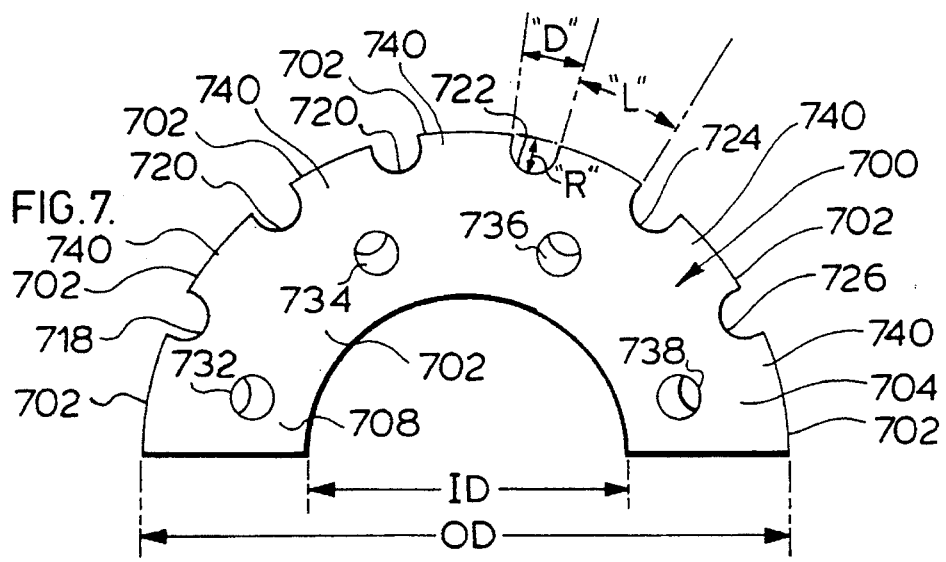
FIG. 7 represents a diagrammatic side view of a preferred saddle according to the invention.
Figure 8:
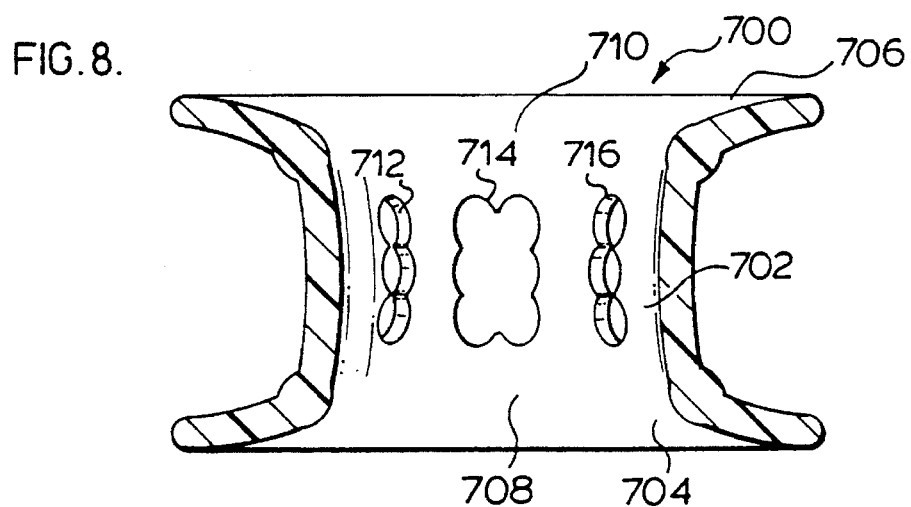
FIG. 8 represents a diagrammatic underside view of a preferred saddle according to the invention.
Figure 9:
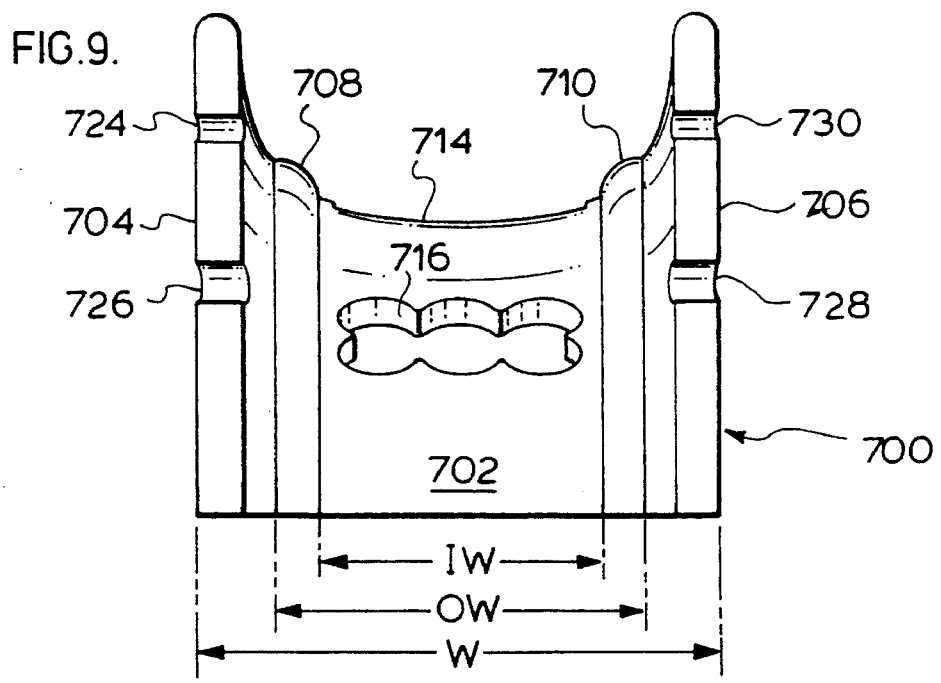
FIG. 9 represents a perspective end view of a preferred saddle according to the invention; and wherein the same numerals denotes like parts.

FIGS. 7, 8 and 9 give side, underside and end views, respectively, of a preferred embodiment of the improved saddle. The saddle shown generally as 700 has a hub section 702 and wings 704 and 706, which join at ribs 708 and 710. Rib 708 appears on all three drawings while rib 710 appears only on FIGS. 8 and 9. The rib diameter will typically be at least 50% larger than the thickness of either the wings or the hub. Three apertures in hub 702 denoted as 712, 714 and 716 are best shown in FIG. 7 while FIG. 9 shows only apertures 716 and 714. Slots 718, 720, 722, 724 and 726 on the edges of wings 704 are shown best in FIG. 7 as is wing 704 with identical slots in wing 706 (not shown). An end view of four slots 724, 726, 728, and 730 is shown in FIG. 9. Weep holes designed to allow liquid to flow from one side of the wing to the other are shown as 732, 734, 736 and 738. As shown in FIG. 7, each of the slots 718, 720, 722, 724 and 726 extends radially with respect to an associated wing and is defined by a pair of spaced side walls and a bottom wall joining the side walls. Each of the side walls is normal to a plane tangent to the circumferential outer edge of the associated wing 704 and 706 define an elongated channel in radial cross-section, with a width of the channel being greater than a depth of a channel. Further, the apertures 712, 714 and 716 are in the form of axially elongated slots.

It will be readily appreciated that alternative embodiments may have more or less numbers of holes, slots and lobes with appropriate and suitable changes in dimensions. For example, the slots may be constituted as radially extending rectangular shaped openings defined by linear sides of adjacent lobes and the outer circumference of the wing as the base of the slot.

In more detail, packing 700 is formed of china clay and has the broad overall dimensions of about 7 cm inner diameter (ID), about 14 cm outer diameter (OD), about 7 cm overall width (W), about 5.5 cm outer hub width (OW) and about 4.5 cm inner hub width (IW). Packing 700 has a somewhat flattened hub portion 702 and a plurality of lobes 740 that take the shape of a flattened convex protrusion having a substantially flat or gently curved edge 742 of a length L that is about three times greater than each of the interlobal distance D at its extreme edge and recess depth R. In the embodiment shown L is about 2.5 cm, D is about 1.2 cm and R is about 0.8 cm. Recesses 712, 714 and 716 at their widest dimension are about 3.5 cm and have a depth of about 1 cm. Apertures 732, 734, 736 and 738 have a diameter of about 0.8 cm.

While the invention has been described in detail and with reference to specific embodiments thereof, it will be apparent to one skilled in the art that various changes and modification can be made therein without departing from the spirit and scope of invention as described and claimed.

We claim:

1. An improved ceramic tower saddle packing having a general shape that is a segment of an inner-peripheral portion of a hollow torus, with respect to the axis of generation of the torus, said saddle packing having a hub central of the torus bounded by a pair of parallel aligned ribs remote one from the other and extending the inner-circumference of the saddle packing, said hub including a plurality of apertures therein, and said saddle packing having a pair of circumferential outer edges wherein each of said edges and said rib closest to said edge define a wing portion, the improvement comprising:

each of said outer edges including a plurality of slots spaced circumferentially therealong, each of said slots extending radially with respect to an associated wing portion, each of said slots being defined by a pair of spaced side walls and a bottom wall joining said side walls, each of said side walls being generally normal to a plane tangent to an associated outer edge, said hub and wing portions defining an elongated channel in radial cross-section with a width of said channel being greater than a depth of said channel, and said apertures being in the form of axially elongated slots.

2. A saddle packing as defined in claim 1, wherein said slots have equal widths and equal depths and a distance between adjacent slots is at least twice said width and at least twice said depth.

3. A saddle packing as defined in claim 2, wherein said slot depth is approximately 0.8 cm, said width is about 1.2 cm and said distance is about 2.5 cm.

4. A saddle packing as defined in claim 1, wherein each said wing portion includes a plurality of apertures therein.

5. A saddle packing defined in claim 1 having an inner diameter of about 7 cm; an outer diameter of about 14 cm, an overall width of about 7 cm, an outer hub width of about 5.5 cm and an inner hub width of about 4.5 cm.

6. A saddle packing defined in claim 1 wherein each of said bottom walls of said slots is generally curved and joins said side walls smoothly.

* * * * *